Sept. 20, 1932.    W. D. BOST    1,878,099
APPARATUS FOR PRODUCING CITROUS FRUIT JUICES
Filed May 10, 1929
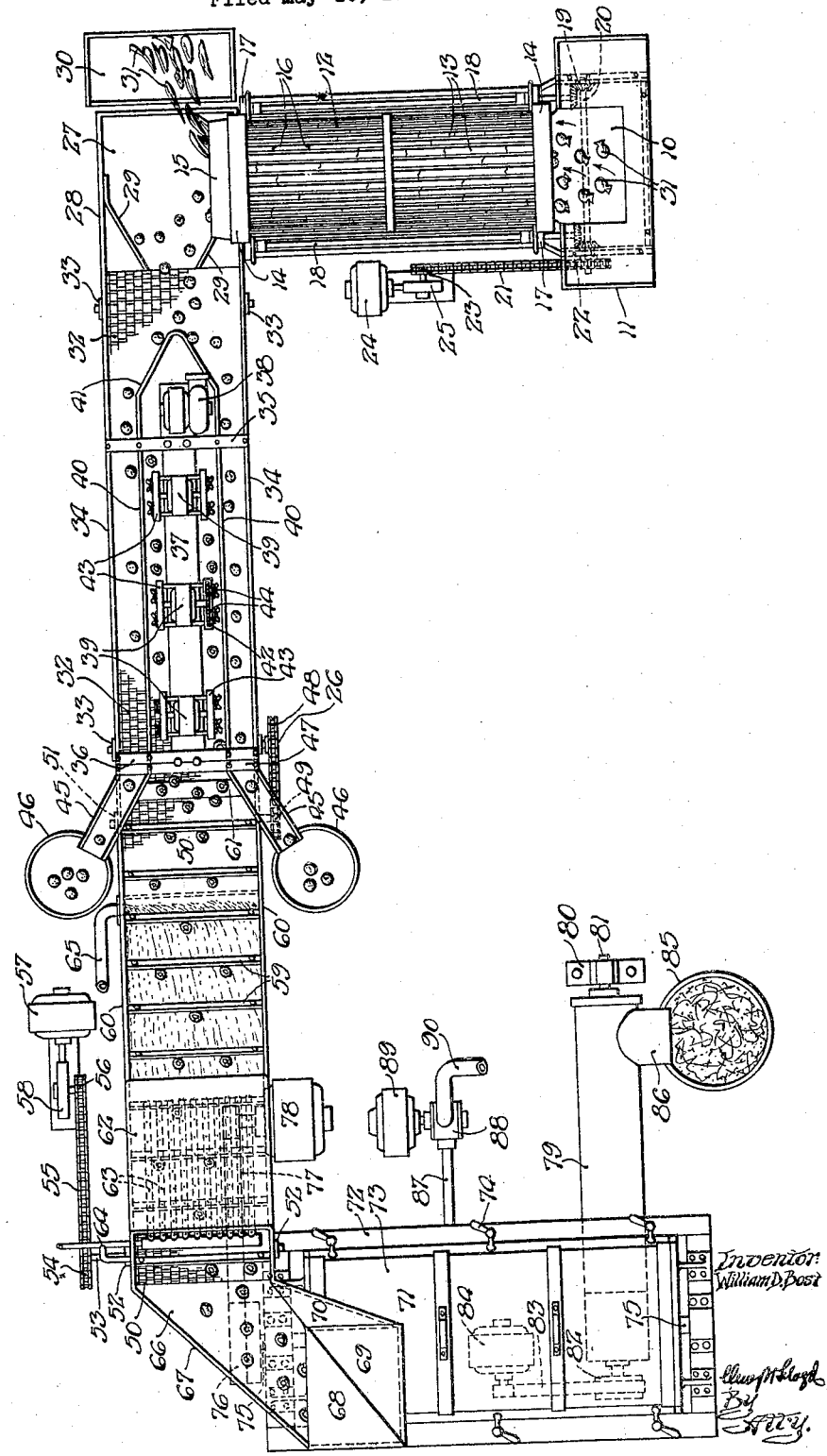

Patented Sept. 20, 1932

1,878,099

UNITED STATES PATENT OFFICE

WILLIAM D. BOST, OF CHICAGO, ILLINOIS, ASSIGNOR TO ORANGE-CRUSH COMPANY, OF CHICAGO, ILLINOIS, A CORPORATION OF ILLINOIS

APPARATUS FOR PRODUCING CITROUS FRUIT JUICES

Application filed May 10, 1929. Serial No. 362,021.

The present invention relates to a process for the production of fruit and vegetable juices and has particularly to do with means for obtaining a substantially continuous production of such juices directly from wrapped fruits or vegetables.

In the present day market, oranges, lemons, limes, and certain other fruits and vegetables are individually wrapped in paper or other material. The reason for this is quite manifest in that it provides an insulating paper between adjacent pieces of fruit.

There are certain forms of disease which affect fruit and vegetables and which are communicated rapidly by contact. The paper or other insulation obviates such contact and the resulting contamination and contagion.

With the ever growing demand for fruit and other organic juices, the necessity for producing such products in eastern and northern districts, remote from where the basic fruit or vegetable grows, is likewise increasing. It is impracticable commercially, although it is done, to extract juices at the place of growth and to then transport the juices to remote markets where it is in demand after treatment.

The present process contemplates the purchase of fruit which is more easily shipped than juice and which it is more praticable to merchandise. Fruit also possesses better preservative qualities than the juice can be given at the source of the production of the fruit. The fruit will be purchased in the remote market and there, from the fruit, will be derived its useful juices.

Only limited portions of the fruit are used in an extracting process. Too much flavoring from the peel is offensive to the taste of the fruit juice. The ends of a fruit, be they the blossom or stem ends, are generally contaminated with dirt. To provide for the production of a clean appearing juice, the ends of the fruit must be treated so that any dirt accumulated therein will be removed. Concurrently, an excess portion of the peel may be removed.

As a preliminary to juice extraction, the fruit must be assorted into good and bad, the good only used, and such good fruit must be washed.

Prior to any of these activities it is necessary to remove the paper or other wrapping from the fruit.

The object of the present invention is the provision of a process which will eliminate the hand work required for removing the paper from the fruit, from removing the ends of the fruit, washing the fruit, and extracting the juices from the cleansed fruit.

A further object of the invention is to provide a process whereby, in a continuous operation, the fruit may be dumped from the shipping boxes and passed through an apparatus with the result that at the close of the process the useless portions of the fruit have been separated therefrom, these portions being the paper wrapper, inferior fruit, and the fruit peeling, together with all of the dirt which may have accumulated on or about the fruit.

These objects and such other objects as may hereinafter appear are obtained by the novel process herein described and which may be accomplished by the agency of an apparatus illustrated in the accompanying single sheet of drawing.

In said drawing, the single figure is a plan view showing the apparatus arranged with some of its members disposed at right angles to others for the purpose of conserving space upon the drawing, although such space saving arrangement may be adopted in a plant where such apparatus is installed.

Like reference characters are used to designate similar parts of the apparatus in the drawing and in the description of the process and apparatus hereinafter given.

Oranges will be used for an example of fruit which may be treated by the novel process in the apparatus herein described.

Such fruit is normally packed in a two sectioned shipping box or crate, a certain number of oranges to each section of the box, each individual orange being fully enclosed in parchment or other wrapping paper.

It is proposed in the present invention to provide a means and apparatus whereby it is only necessary to remove the top cover of such box of fruit and then deposit the fruit from the box into a hopper 10 upon a frame 11, the fruit then passing through the apparatus finally being separated into juice and expressed pulp and peel.

The hopper 10 is inclined downwardly and inwardly in the direction of the arrows thereon.

From the hopper 10, the fruit is discharged into a barrel 12. The barrel 12 comprises suitable ring like members 14, joined together by slats 13, the whole forming an open ended cylinder which, when desired, may be inclined slightly downwardly to aid the passage of fruit therethrough.

Fruit when separated from its wrappings leaves the barrel and is discharged through a constricted section 15 upon one of annular members 14.

Upon the slats 13 at spaced intervals are a number of barbs 16, generally in staggered relation, and which point inwardly of the barrel 12. These barbs engage the wrappers or papers whereby they are loosened from the fruit being rolled and tumbled in the cylinder 12 as such fruit slowly moves from the hopper 10 to the discharge opening 15.

For rotating the cylinder 12, suitable rollers 17 are arranged. Said rollers are upon the shafts 18.

Shafts 18, through the agency of gears 19, are driven by shaft 20 which shaft 20 is driven by a chain 21 through the sprocket 22 on said shaft 20. For driving chain 21, there is a sprocket 23 driven by a motor 24, there being intermediate sprocket 23 and motor 24, a reductive gearing 25.

From the barrel 12, the oranges and the papers which do not adhere to the barbs 16 in said cylinder, are discharged into a hopper 27. The papers have all been removed from the oranges when this stage has been reached and are adapted to be blown aside.

The oranges when rolled onto the hopper 27, which has a wall 28 thereabout, are adapted to engage a pair of guide members 29 secured to wall 28 and which converge.

These direct the flow of the oranges in the trough 27 toward the central portion thereof and toward a conveyer belt.

As the papers and oranges are discharged into hopper 27, the papers are blown by a fan later to be mentioned into a box 30, the wrappers being designated 31 in the drawing.

Arranged at each side of an endless conveyer belt 32 onto which the oranges are discharged from the trough 27 are the only hand operatives who may be employed in the present process. Said endless belt 32 is adapted to be rotated upon rollers 33 at each end of side frame members 34, the said frame members 34 at the side of the belt 32 providing guides for preventing the oranges from rolling from the belt 32.

Upon transverse frame members 34 is disposed connecting the frame members 34 a central supporting base 37 upon which a fan 38 and a plurality of graters 39 are disposed. Fan 38, generally at the end of base posed. Fan 38, drives a blast of air across the hopper 27 forcing the wrappers 31 into the box 30.

Also supported by the transverse frame members 35 and 36 is a divider 40 which comprises parallel walls having a V-shaped end section 41. Oranges passing down the chute 27 are directed toward the center of the belt 32 by the guide members 29. These oranges when picked up by belt 32 impinge upon the V-shaped end 41 of the guide members 40 and the oranges are thus divided into two substantially equal streams, one stream being adapted to be carried by the belt 32 between the frame member 34 and the guide member 40 at one side of frame 37, and the other stream at the other side of said frame. The paths for the oranges just described provide a conveniency for placing operatives along the side frame members 34, there to pick up the oranges which are being slowly moved toward the remainder of the apparatus.

Each of the graters 39, of which there may be more or less than are shown in the present instance, comprises in addition to the motor, rotary graters 42 at each end of the motor. Such graters comprise rapidly rotating discs having a portion of their material punched outwardly to provide a roughened cutting surface.

About the graters 42 is a housing 43 in which there are one or more adjustable windows 44 which are used to determine the extent to which fruit may be inserted therethrough in the direction of the rapidly rotating graters 43.

Oranges traveling down the paths formed by the frame members 34 and the guides 40 are picked up by the various operatives disposed at the side of said frame members. The ends of the fruit are grated off by holding the ends, first one end and then the other end, in contact with the rapidly rotating graters 43.

The fruit thus denuded of the blossom and stem ends and the dirt which generally accumulates thereabout, is then replaced upon the belt 32 but between the two guide members 40 and substantially beneath the longitudinal frame member 37 to be conveyed in the direction of the washing apparatus. Whenever not desired, or necessary, the end grating operation may be omitted.

Should the flow of fruit through the device be too rapid for the number of operatives arranged along the side board 34 to manage the excess fruit which has not been handled is adapted to be discharged through a trough 45 which empties into a receptacle 46. There are two troughs 45 and two receptacles 46, one of each being at opposite sides of the machine.

The trough 45 is secured to a transverse frame member 47, in any suitable manner, such frame member 47 extending transversely of the device and joining the members 34 one to another, and generally being parallel to and contiguous to frame member 36. The width of trough 45 corresponds to the space between side members 34 and guide members 40.

Fruit that is not found by the operatives to be entirely sound or of the proper quality is removed from the apparatus coincidental with the removal of the end peeling and deposited in waste receptacles, these not being shown in the present illustration, but generally being conveniently disposed beneath the endless belt 32.

Belt 32 which is generally a chain or of open link construction is driven through a sprocket wheel 48 secured to one of the rollers 33, said sprocket 48 having a chain 26 with a sprocket 49 secured to roller 51.

From the endless belt 32, the fruit is discharged upon a second endless belt 50, also of a link or chain like construction. The endless belt 50 is adapted to be moved about rollers 51 and 52, the latter being upon a shaft 53. Upon the shaft 53 is a gear 54 driven by a chain 55 which rotates about a sprocket 56 driven by a motor 57, there being reducing gearing 58 intermediate said motor 57 and said sprocket 56.

Transverse slats 59 are arranged upon the belt 50 at spaced intervals and side plates or guide members 60 are disposed at the edges thereof.

Belt 50 has an upward pitch so that the fruit discharged from the belt 32 when received upon the belt 50 is adapted to be elevated, first, through a washing device, and secondly, to a position where the fruit may be discharged into a juice extracting apparatus. There may be intermediate the belts 32 and 50 a chute 61 to facilitate the even discharge of the fruit from one belt to the other without a bruising drop.

During the journey of the fruit upwardly on the belt 50, the fruit is adapted to pass through a housing 62 within which there are a plurality of sprays 63. Said sprays 63 are fed by a water conduit 64 at one end of the housing 62 and a drain 65 at the other.

Either hot or cold water may be employed for washing, but for oranges, cold water generally suffices. The water used for washing the fruit is drained through the belt 50 which, as has been previously stated, is of link or wire construction to permit of the free flow of water therethrough.

The washed fruit, when it attains the position of roller 52 of the belt 50 is deposited in a chute 66, where the direction of travel of the fruit is at a right angle from that which it had occupied upon the belt 50. This change of direction is a matter of choice and not of necessity.

The hopper 66 includes a side wall 67 and a hood or covering partially thereover, comprising the walls 68, 69 and 70, to insure the delivery of the fruit into the extracting apparatus and to prevent the ejection of the fruit should it accumulate or be displaced coincidentally with the feeding of the fruit into the extracting apparatus.

The washed fruit is adapted to be received into a rotary extractor or juice remover 71 from hopper 66. This extractor comprises a frame 72, a cover 73, and fasteners 74 for said cover.

There is beneath the cover and within the clinder formed by such cover and the bottom members of the device not here designated by numerals, a worm or screw extracting member and suitable screens whereby the fruit received into the extractor 71 is first broken up to facilitate the discharge of the juice therefrom, and next forced against perforate plate to cause the juice to be separated from the pulp and peel.

The juice is adapted to be received into a mechanism for collecting it and from thence to be pumped away to cooling or other tanks. The pulp and peeling are forced to the far end of the device in order that as much of the juice as possible may be extracted therefrom, and from said far end, the pulp and peel is conveyed away by a separate device to a receptacle to receive this waste material. Discharge apparatus of large capacity is required as the bulk of pulp and peel to juice is large.

The disintegrating and extracting mechanism within the apparatus 71 is disposed upon a shaft 75 upon one outer end of which is a pulley 76. There is a belt 77 about such pulley, such pulley being actuated by a motor 78 disposed in a convenient position.

The waste material which is conveyed to the far end of the member 71 is discharged through a receptacle 79 in which a worm conveyor member is adapted to be rotated. For supporting the shaft of said worm member is a bracket 80 in which such shaft 81 is journaled.

For rotating the worm upon the shaft 81, a pulley 82 is disposed thereupon. Intermediate said pulley 82 and a motor designated 84 is a belt 83. As the waste material is discharged from the member 71 and forced through the device 79 by a worm, it is collected in a receptacle 85 through a hopper 86.

As there is a rapid production of waste material, it is necessary to provide a forced discharge means like the member 79 for ridding the apparatus 71 of the accumulation of pulp and peel. The orange, and other citrous fruits, comprise a relatively small amount of juice when the proportion of juice to the bulk of pulp and peeling are considered, hence, no apparatus now in use in canning or other industries is adapted to be employed for the purposes herein described, it being necessary to provide a special mechanism better adapted to handle a product relatively low in juice content.

The juice separated from the pulp and peel is adapted to be passed through a screen, not shown, and allowed to drop into a proper receptacle from which it is to be pumped away as previously stated. To move such juice, a conduit 87 discharging into a pump 88 driven by a motor 89 is provided, the discharge from the pump 87 being delivered to suitable tanks through conduits 90.

Several of the devices hereinabove referred to are considered to be novel in themselves and a plurality of patent applications have been filed therefor, one of these relating to the wrapper remover, a second application, to the rotary grater, and a third to the juice extracting apparatus last referred to herein above.

Fruit deposited in the hopper 10, therefore, is adapted to be unwrapped in the cylinder 12, discharged into a hopper 27, and conveyed away by a belt 32. Operatives lined along the belt 32 inspect the fruit and remove the ends through the agency of grating machines 39.

The fruit with its ends and other parts removed is then conveyed on the belt 32 to a second belt 50 which carries the fruit through a washing apparatus from whence it is discharged into a juice extractor. In the extractor, the fruit is broken up, the juice expressed therefrom, and the peel and pulp separated from the juice, the juice being conveyed away in one direction and the pulp and peeling in another.

A continuous operation or process for the production of orange juice or of other fruit juices has thus been devised. Only one handling of the fruit is necessary after it passes into the machine, and that is so arranged that it serves as an inspection thereof and for the single manual operation which is sometimes desired, namely, the removal of the fruit ends in order that the dirt which accumulates thereon will not reach the juice.

The apparatus reduces the number of operations necessary for the production of fruit juice to a minimum, and the apparatus here disclosed and described is relatively compact when the number of operations conducted is considered. Except for the peeling or removing of the ends of the fruit, the entire operation is mechanical. That single operation may sometimes be omitted.

Wherever fruit or orange is herein employed, except when the sense negatives such interpretation, it is intended to include all fruits and all vegetables lending themselves to treatment in accord with the process herein described.

I claim:

A belt conveyor, and a guide means thereover comprising a pair of opposed members having a closed end for deflecting objects on said belt to the side thereof, the other end of said members having an outwardly turned section and being open therebetween to allow the passage of objects in said belt, and discharge spouts at the end of said members, and at the side of said belt to receive material deflected by said outwardly turned sections.

WILLIAM D. BOST.